United States Patent
Rozehrezvani et al.

(10) Patent No.: US 8,902,891 B2
(45) Date of Patent: Dec. 2, 2014

(54) METHOD OF MANAGING BROADCASTS AND MULTICASTS BY A NETWORK DEVICE

(75) Inventors: Mohammadreza Rozehrezvani, Singapore (SG); Nick E. Demmon, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 13/192,081

(22) Filed: Jul. 27, 2011

(65) Prior Publication Data

US 2013/0028254 A1     Jan. 31, 2013

(51) Int. Cl.
*H04L 12/28* (2006.01)
*H04L 12/823* (2013.01)
*H04L 12/801* (2013.01)

(52) U.S. Cl.
CPC ............. *H04L 47/32* (2013.01); *H04L 47/15* (2013.01); *H04L 47/34* (2013.01)
USPC ........................................................ 370/390

(58) Field of Classification Search
CPC ...................................................... H04L 45/16
See application file for complete search history.

(56) References Cited

U.S. PATENT DOCUMENTS

| | | | | |
|---|---|---|---|---|
| 6,389,016 | B1 * | 5/2002 | Sabaa et al. ............... | 370/389 |
| 6,556,541 | B1 * | 4/2003 | Bare ............................ | 370/235 |
| 7,197,044 | B1 * | 3/2007 | Kadambi et al. .......... | 370/418 |
| 7,529,216 | B2 * | 5/2009 | Jou et al. .................... | 370/338 |
| 7,668,923 | B2 * | 2/2010 | Herring et al. ............ | 709/209 |
| 7,675,869 | B1 * | 3/2010 | Anker et al. ............... | 370/255 |
| 7,894,428 | B2 * | 2/2011 | Yamane ...................... | 370/389 |
| RE43,843 | E * | 12/2012 | Donahue et al. .......... | 370/270 |
| 2002/0099900 | A1 * | 7/2002 | Kawarai et al. ............ | 710/317 |
| 2003/0026205 | A1 * | 2/2003 | Mullendore et al. ...... | 370/230 |
| 2005/0165956 | A1 * | 7/2005 | Lee ............................. | 709/238 |
| 2005/0198373 | A1 * | 9/2005 | Saunderson et al. ...... | 709/238 |
| 2006/0045099 | A1 * | 3/2006 | Chang et al. ............... | 370/400 |
| 2006/0245424 | A1 | 11/2006 | Ramanathan et al. | |
| 2007/0076633 | A1 * | 4/2007 | Sin .............................. | 370/254 |
| 2007/0081558 | A1 * | 4/2007 | Shaikli ........................ | 370/474 |
| 2008/0002693 | A1 * | 1/2008 | Moki et al. ................. | 370/390 |
| 2008/0175148 | A1 * | 7/2008 | Todd et al. ................. | 370/235 |
| 2008/0267184 | A1 * | 10/2008 | Arisoylu et al. .......... | 370/391 |
| 2010/0165989 | A1 * | 7/2010 | Jain et al. ................... | 370/390 |
| 2010/0202331 | A1 | 8/2010 | Zhang et al. | |
| 2010/0272104 | A1 * | 10/2010 | Li et al. ...................... | 370/390 |
| 2011/0019673 | A1 * | 1/2011 | Fernandez Gutierrez  | 370/390 |
| 2011/0096682 | A1 * | 4/2011 | Koch et al. ................. | 370/252 |
| 2012/0039332 | A1 * | 2/2012 | Jackowski et al. ........ | 370/389 |
| 2012/0110656 | A1 * | 5/2012 | Santos et al. .............. | 726/13 |
| 2012/0250686 | A1 * | 10/2012 | Vincent et al. ............ | 370/392 |

OTHER PUBLICATIONS

Tissieres, Cedric. "Report Piconet with Passive Ack". Oct. 16, 2003.

* cited by examiner

*Primary Examiner* — Gregory Sefcheck
*Assistant Examiner* — Jael Ulysse

(57) ABSTRACT

A method of managing broadcasts and multicasts in a network. A packet having a packet number is received and compared to a last received packet number stored in memory. If the packet number is smaller than or equal to the last received packet number, then the packet is dropped. If the packet number is greater than the last received packet number then the packet is processed.

18 Claims, 5 Drawing Sheets

| PACKET TYPE | UPDATE COMMANDER | TIME STAMP | BLINK |
|---|---|---|---|
| LAST RECEIVED PACKET NUMBER | 001 | 012 | 002 |
| COMMANDER ID | | | 10A |

METHOD OF MANAGING BROADCASTS AND MULTICASTS BY A NETWORK DEVICE

BACKGROUND OF THE INVENTION

Wired networks, such as LANs, allow nodes to be connected to and communicate with each other by transmission of packets. A broadcast packet is a packet which is addressed to every node in a network. In a network having one or more loops, there is a risk that broadcast packets may circulate for a prolonged period or indefinitely.

Switches are used in networks, especially but not limited to Ethernet LANs, to route data packets to a desired destination. Switch stacking allows several switches to be connected together; e.g. to increase the number of available ports, allow scalability, or facilitate easier management of the switches. In some cases the switches in the stack may have the same IP address. Stack control messages may be used to manage the stack.

BRIEF DESCRIPTION OF THE DRAWINGS

Some examples are described in the following figures.

DETAILED DESCRIPTION

A broadcast packet is a packet addressed to all nodes in the network. A multicast packet is a packet addressed to a pre-defined group of nodes. A node receiving a broadcast or multicast packet will typically re-forward it to all adjacent nodes. A loop is a cyclic path which causes a packet to return to a node from which the packet has already been transmitted.

When packets are broadcast or multicast in a network having one or more loops the packets may circulate for a prolonged period or even indefinitely, as the packet is forwarded back and forth between nodes. For example, with reference to FIG. 1, which shows an example topology of a network, the first node D1 may send a broadcast packet to nodes D2 and D3. Nodes D2 and D3 would note that the packet is a broadcast packet and forward the broadcast packet to all nodes to which they are connected, including nodes 1 and 4. Node D4 would then forward the broadcast packet to node 5 and back to nodes D2 and D3, which may forward the broadcast packet back to node D4 etc.

Figure 1:
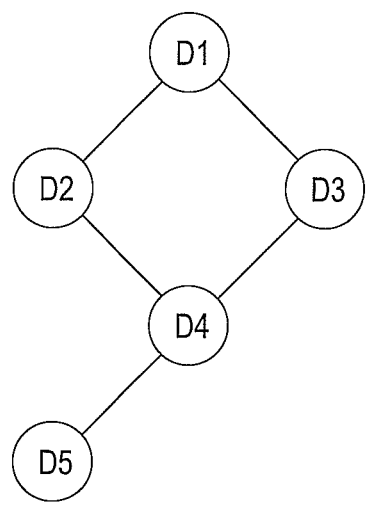
FIG. 1 is an example of a topology of a network comprising a plurality of network devices.

It should be noted that FIG. 1 is an example only and the methods described in this disclosure may be applied to any type of topology, including but not limited to a ring, daisy chain, mesh or a combination of thereof. In one example each node may be directly connected to each other node by a dedicated link and port.

Figure 2A:
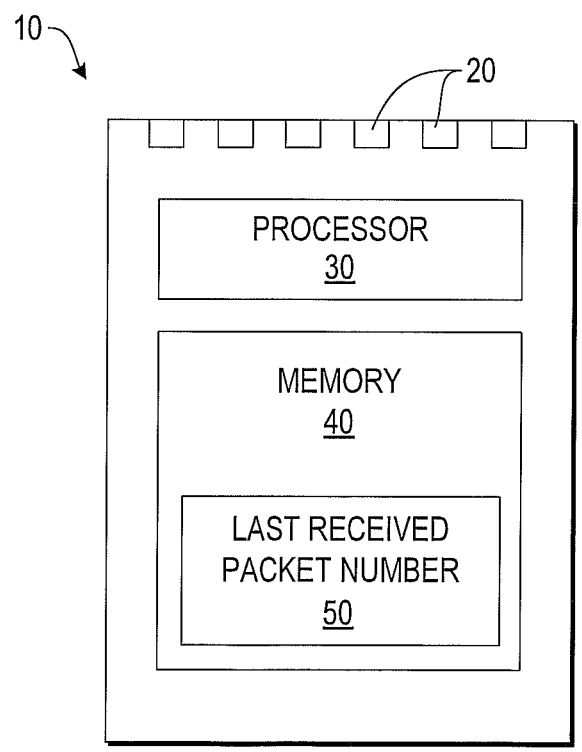
FIG. 2a is one example of a network device.
Figure 2B:
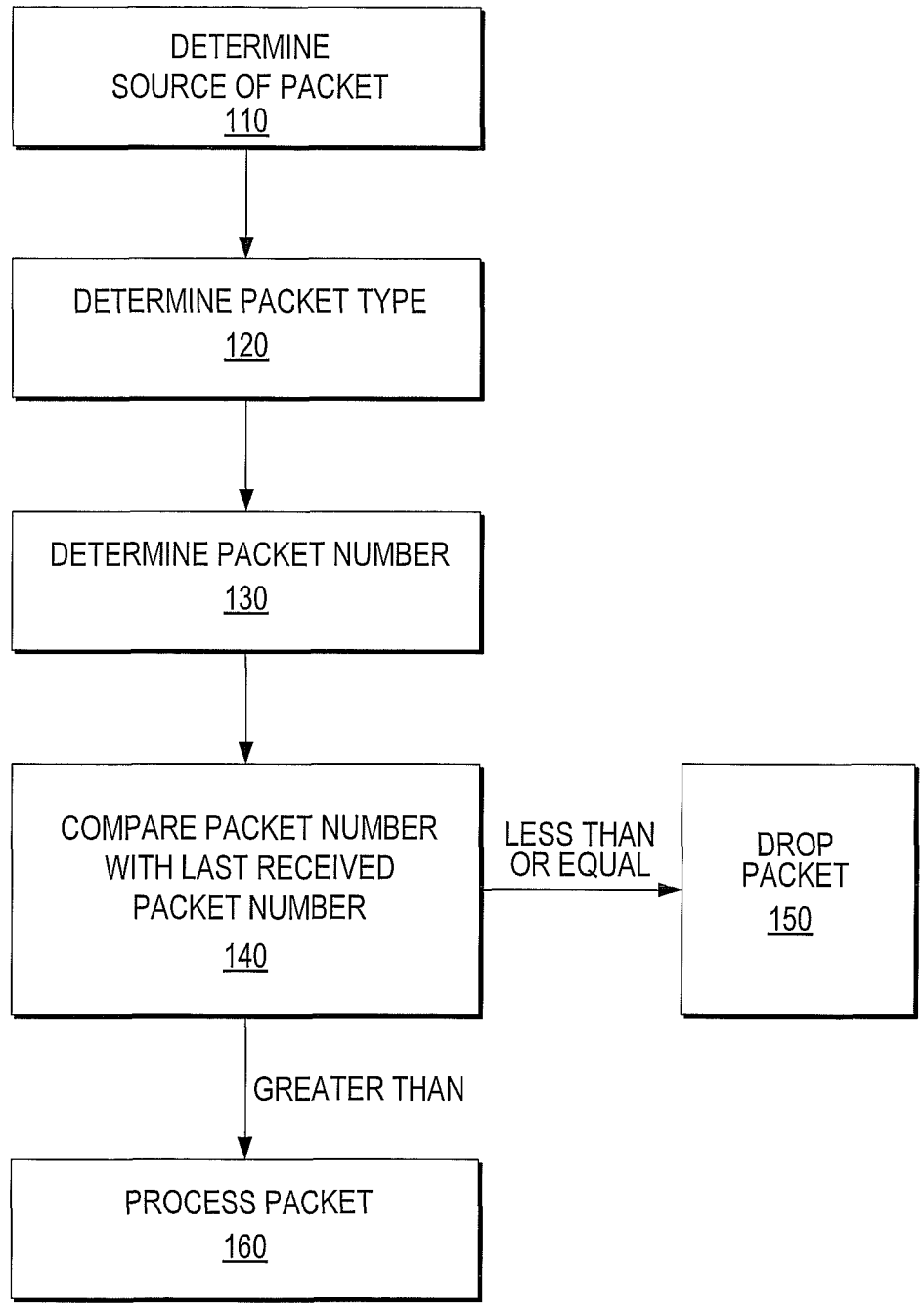
FIG. 2b is one example of a method of managing received packets in a network device.
Figure 2C:
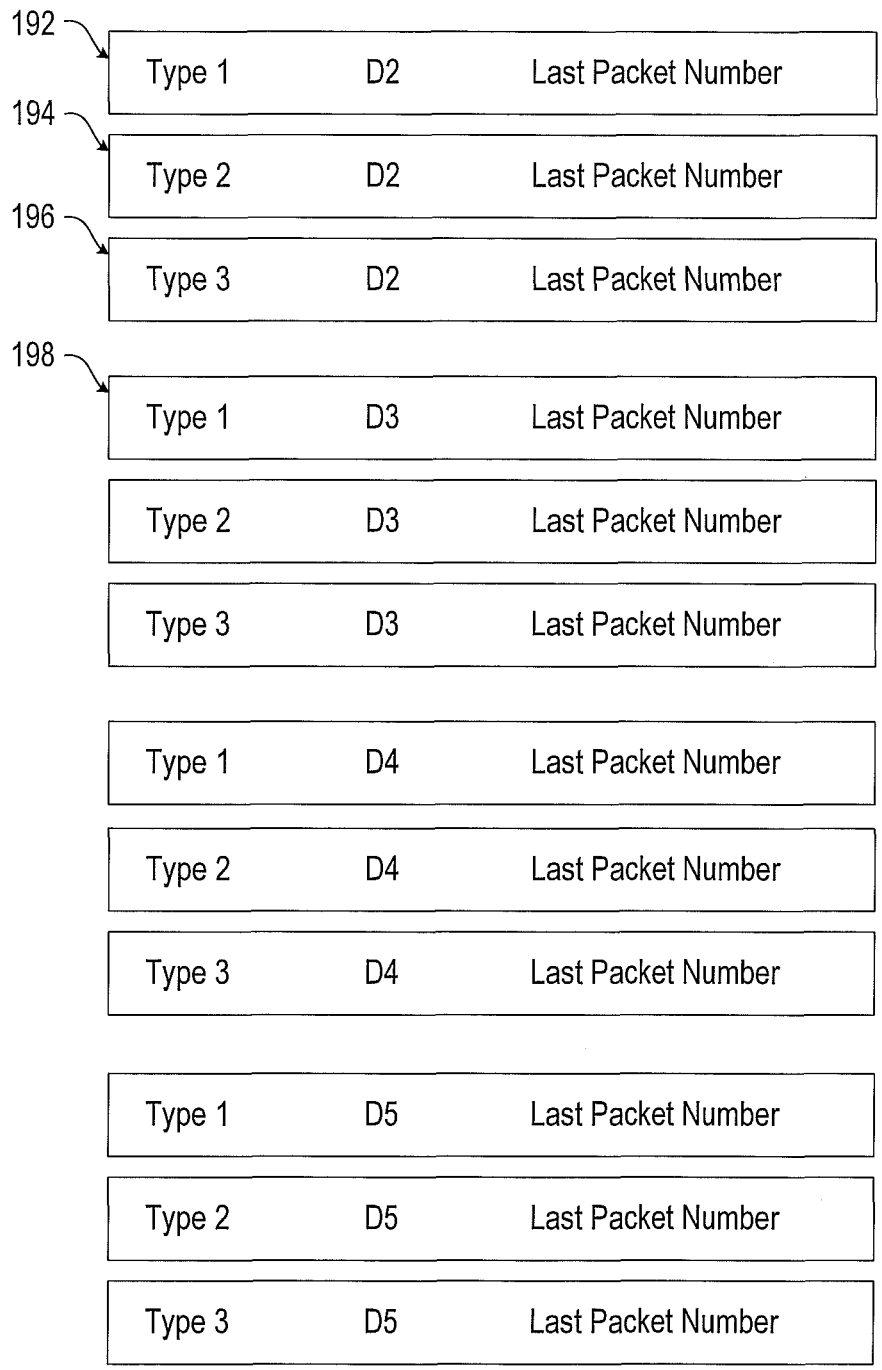
FIG. 2c is one example of a last received packet register.

FIG. 2 shows an example network device 10 having a plurality of ports 20, a processor 30 and a memory 40. The ports are for sending and/or receiving packets via wired links to other network devices. The processor may be a microprocessor, microcontroller, processor module or subsystem (including one or more microprocessors or microcontrollers), ASIC, or other control or computing device etc. In one example the processor is a FPGA. The memory 40 may be part of the processor or may be a separate memory. It stores a packet number of the last broadcast packet received by the network device. The last received packet number is stored in a table 50, or the like, in memory which may be referred to as the 'last received packet number register'.

Referring now to the flow diagram FIG. 2 (b), an example of processes which may be performed by the processor of a network device when it receives a packet, will be described. At block 110 the processor determines the source of the packet (e.g. by referring to a field of the packet which specifies the source).

At block 120 the processor determines the type of packet (e.g. by referring to a field of the packet which specifies the packet type). At 130 the processor determines the packet number (e.g. by referring to a field of the packet which specifies the packet number or a packet identifier).

At block 140 the processor compares the packet number of the received packet with a last received packet number stored in memory. For example, if network device D4 receives a 'time stamp' packet which has been broadcast or multicast by network device D1 (i.e. the source=network device D1), then the processor of network device D4 may refer to the memory and compare the packet number of the 'time stamp' packet which has just been received with the packet number of the last received 'time stamp' packet from network device D1.

If the packet number is greater than the last received packet number this indicates that the packet number has not yet been processed by the network device. Therefore the packet is processed and forwarded at 160. Processing the packet may comprise, updating the network device's memory to record the packet number of the received packet as the 'last received packet', forwarding the packet to connected network devices and any other steps related to processing of the packet.

If the packet number is less than or equal to the last received packet number this is taken to indicate that the packet has already been processed by the network device and thus it is dropped (not processed further) at 150. In this way continual or unnecessary re-forwarding of packets may be reduced or eliminated.

Various specifics of implementation and variations will now be described.

As the packet number may have a limited number of bits, special consideration may be made for rollover of the packet number. E.g. if in one example the packet number is a 16-bit field, then it will start from 0x0001 until it reaches to 0xffff after that the next packet number will be 0x0001 again which is smaller than 0xffff. Therefore the processor can check whether the most significant bit has changed in order to discover if there has been a rollover. If there has been a rollover, then the processor will accept the packet (as if it had a larger value) and process it, for example by forwarding the packet to connected network devices and updating the last received packet number stored in memory to the packet number of the broadcast or multicast packet which has just been received.

It is envisaged that the method of FIG. 2 (b) will be applied primarily to multicast and broadcast packets. Such packets may be detected by examination of the packet; in one example the packet may have a field indicating that it is a broadcast or multicast packet and may have a field indicating its source.

If the network device itself is the initial source of the multicast or broadcast packet then the network device may drop the packet. E.g. in FIG. 1 if network device D1 initiates a broadcast packet and network device D2 re-forwards the packet back to network device D1, then network device D1 may check the source of the packet and then drop the packet on discovering that network device D1 itself was the initiator (source) of the broadcast packet. In other arrangements a similar result may be achieved by having the initiating network device record the packet number of packets it broadcast or multicasts in a last received packet register (as if it had just received and processed the packet).

An example of the method in action will now be described with reference to FIG. 1. The network devices D1-D5 will be referred to as 'nodes' of the network.

Node D1 sends a broadcast packet via all connected links to nodes D2 and D3. Upon receiving the broadcast packet for the first time, nodes D2 and D3 will update the last received packet number in their registers and forward the broadcast packet to nodes D1 and D4. When node D1 receives the packet re-forwarded from nodes D2 and D3, it will drop or 'kill' the packet (e.g. after determining that it was the original source of the broadcast packet). Likewise, node D4 will receive the broadcast packet from nodes D2 and D3. Node D4 will compare the packet number of the received broadcast packet and process the packet if its packet number is greater than the last received packet number stored in memory. Thus it will process the packet which it receives first and drop the other one. The packet will then be forwarded to node D5 and node D2 & D3. Node D5 will process and re-forward the packet via all connected links. Node D4 will receive the re-forwarded packet from node D5 and kill it.

In this way broadcast packets may be prevented from continually circulating within the network. The method of this disclosure is relatively simple, usually requires relatively little processing power and in many cases may be executed rapidly by each node. In certain implementations it may allow the network to respond quickly to changes in topology (e.g. if an extra node is added or a node removed), as each node can make a decision whether or not to forward a packet based on a packet number, without necessarily taking into account the network topology. This is an advantage compared to methods such as Spanning Tree Protocol which aim to prevent loops from forming in a network, but generally require each node to form an awareness of the surrounding network and consequently may take some time to adjust to changes in the network when new nodes are added or existing nodes removed.

In some networks, any network device may initiate a broadcast or a multicast. Where any network device is allowed to initiate a broadcast or multicast, then a network device receiving a broadcast or multicast packet should consider the source of the packet (as described at block 110 of FIG. 2 b) and take it into account when storing the last received packet number in memory. FIG. 2 c) shows an example of an area of memory 50 which stores the last received packet number for each type of packet by source node.

Entry 192 stores the last received packet number for packet type 1 from source D1 (where D1 is a network device which originated the packet). Entry 194 stores the last received packet number for packet type 2 from source D1. Entry 196 stores the last received packet number for packet type 3 from source D1. Entry 198 stores the last received packet number for packet type 1 from source D2 etc.

The information 50, referred to generally as a 'last received packet register', may be stored as a table in primary memory (e.g. in RAM). Alternatively each entry may be stored in a separate register (memory) of a processor. E.g. entry 192 may be stored in a first register of a FPGA, entry 194 may be stored in a second register of an FPGA etc; the FPGA knows which register stores which information and so, for instance, when receiving a packet type 2 which originated from source D1, the FPGA knows to compare the packet number to the number stored in register 194.

Each entry (192, 194 etc) may be set to zero when the network device is initiated. When a network device broadcasts or multicasts a packet of a particular type for the first time the packet may be given packet number greater than zero (e.g. 0x001). That way when a network device receives a packet of a particular type from a particular source for the first time it will process it as a new packet because the packet number will be greater than the default initial value of the register.

The method of the present disclosure may be used in networks of any size. However, where any node (network device) is allowed to initiate broadcasts or multicasts then the method may be best suited to small networks (e.g. networks having ten or fewer nodes). In large networks, the size of a memory storing the last packet numbers for each type of packet from each other node in the network could become quite large.

Variations on the method of FIG. 2 a) are possible. For example block 110 may not be used if the network is such that only one network device (a 'commander') is allowed to initiate broadcasts and multicasts. Likewise, if there is only one type of broadcast packet then block 120 need not be used.

Figure 5:
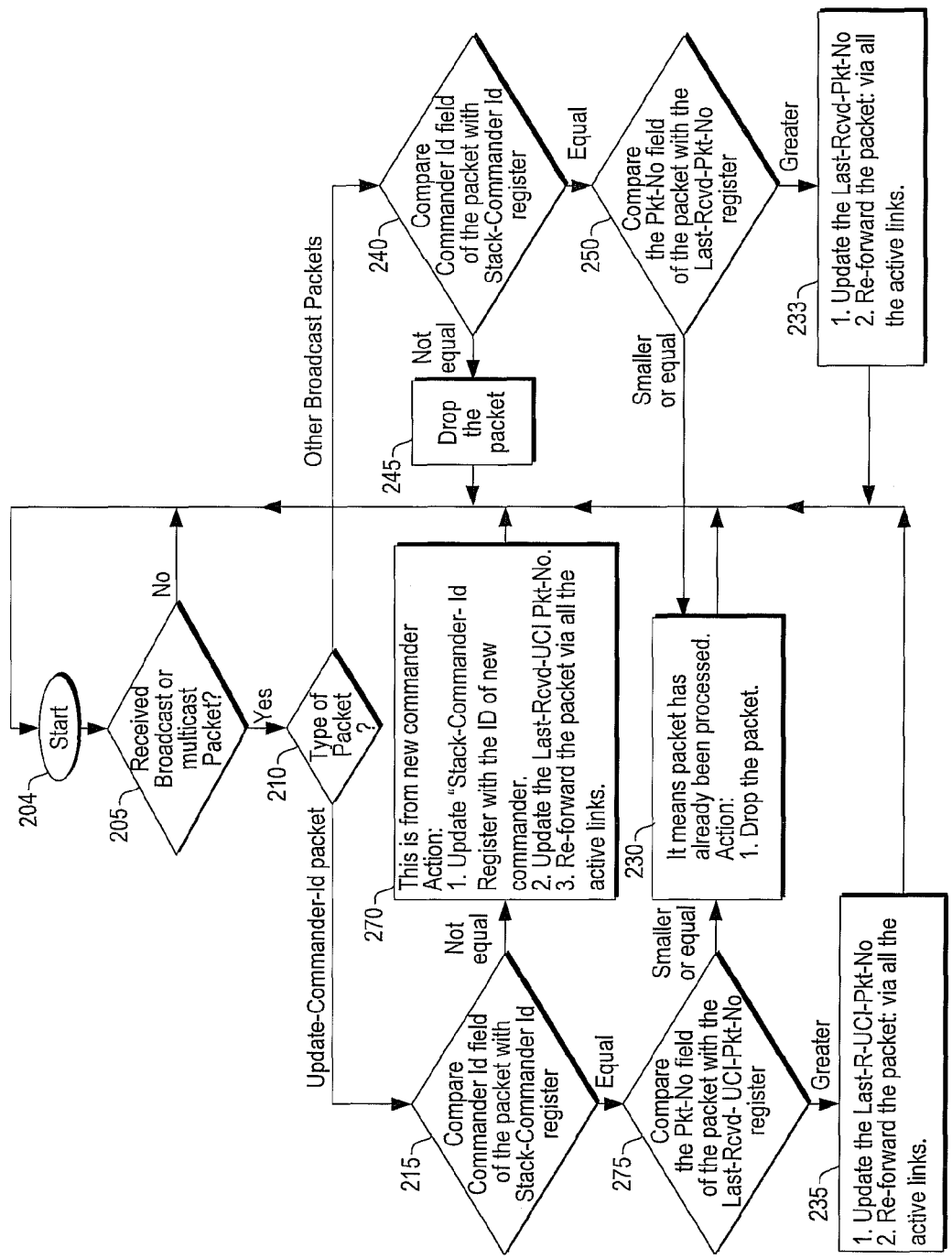
FIG. 5 is a flow diagram showing an example method for managing the flow of broadcast or multicast control messages in a network.

A more specific example will now be described with reference to FIGS. 3, 4 and 5. In this example the method is applied to a stack of network devices, such as a stack of switches. A stack is a set of network devices which are connected by wired links and which may be managed as a smaller number of logical network devices. E.g. a stack may comprise a plurality of switches which are connected via a wired interconnect technology to create one or more logical switches. The term 'switch' is used here in a broad sense and includes networking devices having a switching function such as a server having an integrated LAN switch or a router.

Figures 3, 4:
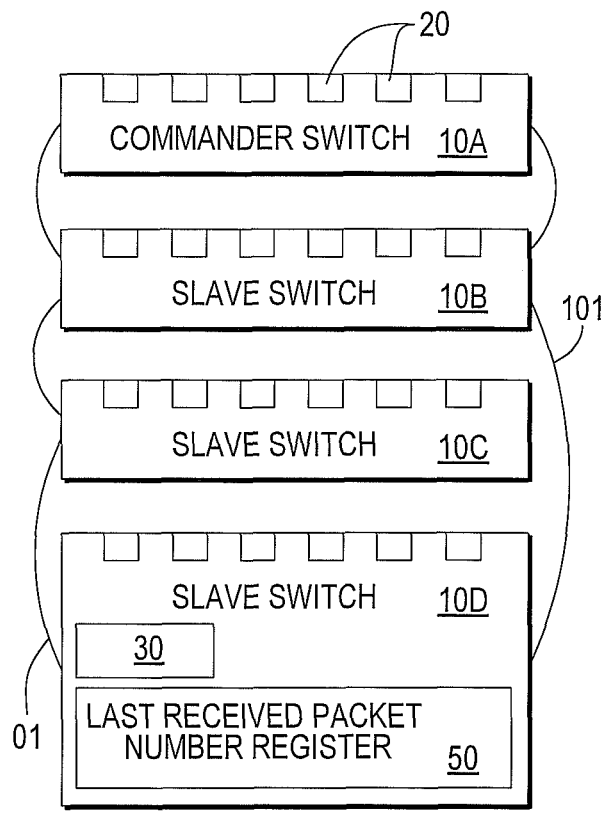
FIG. 3 is an example of a stack of switches.
FIG. 4 is an example of data relating to a last received packet and current stack commander ID.

FIG. 3 shows an example of a stack of switches 100. The stack 100 comprises switches 10A, 10B, 10C and 10D which act as a single logical switch. Each switch has a plurality of data ports 20 for sending and/or receiving data external to the stack, e.g. over a wired LAN. The data ports may be Ethernet ports. The switches 10A, 10B, 10C and 10D are connected by wired links 101 and stack control packets, relating to operation of the stack, may be sent over the wired links 101. Switch 10D is shown as having a processor 30 and last received packet number register 50 as described above in FIG. 2 a), but it is to be understood that the other switches may also have similar components. In one example the wired links connecting the switches may be cables connecting the switches' data ports 20, in other examples the switches may have separate ports for communication within the stack. E.g. a switch may have a plurality of Ethernet ports at the front and separate ports at the back for intra-stack communication. Communication within the stack comprises data packets and stack control packets; in some examples both data packets and stack control packets are sent by the same ports, while in other examples dedicated ports may be used for each. Stack control packets may be point to point, or may be multi-cast or broadcast. Broadcasting the stack control packets is an efficient way to ensure that each switch in the stack gets the stack control packet; which is desirable for certain types of stack control packet such as timestamps.

In the example of FIG. 3, switch 10A is designated as the stack commander while the switches 10B, 10C and 10D are slave switches. The stack commander sends control messages in the form of stack control packets to the slave switches to co-ordinate operation of the switches in the stack. The commander may be predetermined or elected within the stack based on properties of the switches in the stack (e.g. the fastest switch may be chosen as the commander).

The stack commander may broadcast stack control packets to all of the switches in the stack. There may be various types of stack control packet; for example a 'time stamp' packet may be sent by the commander to synchronize the time of all the switches in the stack; a 'blink' packet may be sent by the commander to cause the switches receiving the packet to 'blink' their LEDs, and an 'update commander' packet may be broadcast when it is desired to change the stack commander. For example, the stack commander may be changed to a back-up stack commander when the original stack commander is down or out of service, or to a new switch if a new more powerful switch is added to the stack. In these cases the new stack commander would broadcast an 'update commander' stack control packet to all other switches in the stack. Each switch's memory may act as a 'last received packet number register' storing the last received packet number for each type of broadcast stack control message received by that switch. Further, the memory may store a current stack commander ID in a stack commander ID register. In contrast to the memory shown in FIG. 2 c) there are not separate register entries for each source node as the network only has one commander (which can send broadcasts) at any one time and this may be stored in a stack commander ID register. Thus the size of the network could be quite large without requiring a large memory to store the last received packet numbers.

An example of the contents of the memory are shown in FIG. 4. In FIG. 4 a first register in the switch's memory stores the last received packet number for broadcast packets of the following type: update commander, time stamp and blink. Thus it can be seen that, in this example, according to the register, the packet number of the last received 'update commander' stack control broadcast packet received by the switch is '001'. The packet number of the last received time stamp is '012' and the packet number of the last received LED blink is '002'. Further, the commander ID of the current stack commander is recorded as '10A' in the stack commander ID register. As the last received packet number is held in memory the switch is able to compare it with new incoming packets regardless which port they are received at and so may be able to stop itself from forwarding the same packet twice, even when the packet is received at two or more different ports.

When a standby commander takes over from a commander (e.g. if the commander has failed), the standby commander will broadcast an update commander packet. All devices in the network will receive the update commander packet and will learn that the commander has changed. At this time all devices will reset their last packet no registers to zero, because the new commander will start sending broadcast packet from no. 1.

When the stack commander switch generates a stack control packet for broadcast to other switches in the stack, it adds its commander ID in a commander ID field of the packet and a packet number in a packet number field of the packet. Each switch in the stack may handle received broadcast packets according to the method shown in the flow chart of FIG. 5.

The method starts at 201. At 205 the switch checks if it has received a stack control broadcast or multicast packet (as opposed to no packet, or a point to point packet, or a packet which is not a stack control packet). This check may be carried out periodically. When a broadcast or multicast stack control packet is received the method proceeds to 210 and the type of stack control packet is determined. If the packet is an update commander (UCI) packet, then at 215 the commander ID of the packet (recorded in a field of the packet) is compared with the current commander ID stored in the memory of the switch. If the commander ID of the recently received packet is different, then at 220 the switch updates its stack commander ID register to record the commander ID of the new packet as the current commander ID. The last received packet number is also updated to correspond to the packet number of the recently received packet. Then the switch forwards the update commander packet via all of its active links. On the other-hand, if the update commander ID is the same as the current commander ID stored in memory, then the switch compares the packet number of the packet with the last received packet number for update commander packets stored in the last received packet number register at 225. If the packet number is smaller or equal this indicates that the packet has already been processed by the switch and therefore the packet is dropped and not re-forwarded. If the packet number is greater than the last received packet number stored in memory then the switch updates its memory to record the packet number of this packet as the last received packet number and forwards the packet via all of its active links.

If at 210 it is determined that the just received broadcast stack control packet is not an update commander packet, then at 240 the commander ID field of the packet is compared with the commander ID stored in the switch's commander ID register. If the commander ID of the incoming packet is different to that stored in the register, then at 245 the packet is discarded and is not processed as it does not originate from the current stack commander. However, if the commander ID is equal to the commander ID stored in memory, then the packet number field of the stack control packet is compared to the packet number stored in the last received packet number register. If the packet number of just received packet is equal or smaller to that stored in the register then the packet is discarded at 230. If the packet number is greater than that stored in the last received packet number register, then the last received packet number register is updated to record the packet number of the just received packet as the last received packet number and the switch re-forwards the packet via all active links.

In the above example the stack had one commander (switch 10A) and the other switches were slave switches which combined with the commander switch to form a single logical switch. In other examples, the stack may have two or more logical switches. E.g. switches 10A and 10B might form a first logical switch with switch 10A being the commander; while switches 10C and 10D might form a second logical switch with 10C being the commander. In that case the same methodology is applied, but rather than being broadcast the stack control packets are multicast to all devices in the logical switch group; e.g. commander 10A would send packets to a first multicast group, while commander 10C would send packets to a second multicast group. The packets may include a field indicating which multicast group they are intended for. When a network device receives a multicast intended for a multicast group which it is not a part of, it may check the packet number and perform the steps shown in FIG. 5, e.g. forward the packet if it has not been received before and update the last received packet number, but does not otherwise act on the contents of the packet, e.g. it won't blink its LED (in the case of a blink packet) or synch its clock (in the case of a time stamp packet).

The methods described in flow charts of FIG. 2 a) and 5 may be implemented by a processor of the network device (e.g. switch). As the method is relatively simple it is particularly suitable to be carried out by an FPGA. However, the present disclosure is not limited to the case were the method is carried out by an FPGA and it will be appreciated that embodiments can be realized in the form of hardware, software module or a combination of hardware and software modules. Any such software module, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits etc. It will be appreciated that the storage devices and storage media are embodiments of a non-transitory computer-readable storage medium that are suitable for storing a program or programs that, when executed, for example by a processor, implement embodiments. Accordingly, embodiments provide a program comprising code for implementing a system or method as claimed in any preceding claim and a non-transitory computer readable storage medium storing such a program.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of managing broadcasts and multicasts by a network device in a network comprising:
   receiving a broadcast or multicast packet having a packet number;
   storing the packet number of the received broadcast or multicast packet in a memory;
   receiving another broadcast or multicast packet having a packet number;
   comparing the packet number of the another broadcast or multicast packet to the packet number of the broadcast or multicast packet stored in the memory;
   in response to the packet number of the received another broadcast or multicast packet being smaller than or equal to the packet number stored in the memory, dropping the received another broadcast or multicast packet;
   in response to the packet number of the received another broadcast or multicast packet being greater than the packet number stored in the memory, processing the another broadcast or multicast packet;
   determining whether the received another broadcast or multicast packet is an update commander packet, wherein the update commander packet is to change a designation of a stack commander switch; and
   in response to the received another broadcast or multicast packet being an update commander packet, and in response to a commander identifier (ID) specified in the received another broadcast or multicast packet being different from a commander ID stored in the memory, updating the commander ID stored in the memory to change the designation of the stack commander switch.

2. The method of claim 1 wherein processing comprises forwarding the received another broadcast or multicast packet.

3. The method of claim 1 wherein processing comprises updating the packet number stored in memory to be the packet number of the received another broadcast or multicast packet.

4. The method of claim 1 comprising determining a type of the received another broadcast or multicast packet and wherein comparing comprises comparing the packet number of the received another broadcast or multicast packet to a last received packet number for that type of packet stored in the memory.

5. The method of claim 4 comprising determining a source of the received another broadcast or multicast packet and wherein comparing comprises comparing the packet number of the received another broadcast or multicast packet to a last received packet number from that source for that type of packet.

6. The method of claim 1 wherein determining whether the received another broadcast or multicast packet is an update commander packet is carried out prior to comparing the packet number of the another broadcast or multicast packet to a last received packet number stored in the memory.

7. The method of claim 1 wherein in response to the received another broadcast or multicast packet not being an update commander packet, comparing the commander ID of the received another broadcast or multicast packet with the commander ID stored in the memory, and dropping the received another broadcast or multicast packet in response to the commander ID of the received another broadcast or multicast packet being different from the commander ID stored in the memory.

8. A stackable switch comprising:
   a port;
   a last received packet number register on which is stored a packet number of a last received broadcast or multicast packet; and
   a processor to compare the packet number of the last received broadcast or multicast packet stored in said register with a packet number of another broadcast or multicast packet received by the port, to forward said received another broadcast or multicast packet in response to the packet number of the received another broadcast or multicast packet being greater than the packet number of the last received broadcast or multicast packet stored in the register and to drop the received another broadcast or multicast packet in response to the packet number of the received another broadcast or multicast packet being smaller than or equal to the packet number stored in the register, wherein the processor is to determine whether the received another broadcast or multicast packet is an update commander packet, and in response to the received another broadcast or multicast packet being an update commander packet and in response to a commander identifier (ID) specified in the received another broadcast or multicast packet being different from the commander ID stored in a commander ID register, update a commander ID stored in the commander ID register to change a designation of a stack commander switch.

9. The stackable switch of claim 8 wherein the processor is to update the packet number of the last received broadcast or multicast packet stored in the register when the processor receives a broadcast or multicast packet having a packet number greater than the packet number currently stored in the register.

10. The stackable switch of claim 8 wherein the register stores a last received packet number for each of a plurality of different packet types and wherein the processor is to determine a type of the another broadcast or multicast packet received by the port before comparing the packet number of the received another broadcast or multicast packet with the last received packet number for that type of packet.

11. The stackable switch of claim 8 wherein the register stores a last received packet number for each of a plurality of sources and wherein the processor is to determine the source of the received another broadcast or multicast packet and to compare the packet number of the received another broadcast or multicast packet with the last received packet number from that source.

12. The stackable switch of claim 8 wherein the processor is to, in response to the received another broadcast or multicast packet not being an update commander packet, compare the commander ID of the received another broadcast or multicast packet with the commander ID stored in a commander ID register, and drop the received packet in response to the commander ID of the received another broadcast or multicast packet being different from the commander ID stored in the commander ID register.

13. A stack of switches connectable by wired links, said stack comprising a plurality of local area network (LAN) switches; one of said switches comprising at least one port to receive stack control packets, a memory for storing a last received stack control packet number and a stack commander identifier (ID), and a processor to:
 determine whether a stack control packet received by said port is an update commander packet, wherein the update commander packet is to change a designation of a stack commander switch;
 in response to the received stack control packet not being an update commander packet, compare a packet number of the stack control packet with the last received packet number stored in the memory, drop the received stack control packet in response to the packet number of the received stack control packet being smaller than or equal to the last received packet number stored in the memory, and process the received stack control packet in response to the packet number of the stack control packet being greater than the last received packet number stored in the memory; and
 in response to the received another broadcast or multicast packet being an update commander packet, and in response to a stack commander identifier (ID) specified in the received another broadcast or multicast packet being different from a stack commander ID stored in the memory, updating the stack commander ID stored in the memory to change the designation of the stack commander switch.

14. The stack of claim 13 wherein the processor is to update the last received packet number stored in the memory in response to the received stack control packet number being greater than the last received packet number stored in the memory.

15. The stack of claim 13 wherein the processor is to update the commander ID stored in the memory in response to the commander ID specified in the broadcast packet being different from the commander ID stored in the memory.

16. The stack of claim 13 wherein the processor is to drop the received broadcast stack control packet in response to said packet not being an update commander ID packet and the commander ID of the received broadcast stack control packet being different from the commander ID stored in the memory.

17. The stack of claim 13 wherein one of the switches in the stack is the stack commander switch and the other switches are slave switches.

18. The stack of claim 13 wherein several of the switches in the stack are capable of both generating and receiving stack control broadcast or multicast packets.

* * * * *